(12) United States Patent
Klaiman et al.

(10) Patent No.: US 11,551,053 B2
(45) Date of Patent: Jan. 10, 2023

(54) DENSELY CONNECTED CONVOLUTIONAL NEURAL NETWORK FOR SERVICE TICKET CLASSIFICATION

(71) Applicant: SAP SE, Walldorf (DE)

(72) Inventors: Shachar Klaiman, Heidelberg (DE); Marius Lehne, Berlin (DE)

(73) Assignee: SAP SE, Walldorf (DE)

( * ) Notice: Subject to any disclaimer, the term of this patent is extended or adjusted under 35 U.S.C. 154(b) by 735 days.

(21) Appl. No.: 16/541,963

(22) Filed: Aug. 15, 2019

(65) Prior Publication Data
US 2021/0049443 A1 Feb. 18, 2021

(51) Int. Cl.
| | | |
|---|---|---|
| G06F 40/284 | (2020.01) | |
| G06N 3/04 | (2006.01) | |
| G06N 3/08 | (2006.01) | |
| G06F 40/30 | (2020.01) | |

(52) U.S. Cl.
CPC .............. *G06N 3/04* (2013.01); *G06F 40/284* (2020.01); *G06F 40/30* (2020.01); *G06N 3/0454* (2013.01); *G06N 3/08* (2013.01); *G06N 3/084* (2013.01)

(58) Field of Classification Search
CPC ........ G06N 3/0454; G06N 3/04; G06N 3/084; G06N 3/08; G06N 3/088; G06N 3/02; G06N 3/0472; G06N 5/04; G06F 40/284; G06F 40/279; G06F 40/30
USPC ............. 704/9, 257, 202, 256.7, 256.8, 259; 706/20, 26
See application file for complete search history.

(56) References Cited

U.S. PATENT DOCUMENTS

| | | | | |
|---|---|---|---|---|
| 8,775,341 | B1* | 7/2014 | Commons ............. | G06F 40/253 706/20 |
| 9,015,093 | B1* | 4/2015 | Commons ............. | B60W 30/00 706/26 |
| 9,141,882 | B1* | 9/2015 | Cao ....................... | G06K 9/6251 |
| 2015/0036920 | A1* | 2/2015 | Wu ....................... | G06V 10/454 382/156 |
| 2016/0110343 | A1* | 4/2016 | Kumar Rangarajan Sridhar ........ | G06F 40/216 704/9 |
| 2018/0357531 | A1* | 12/2018 | Giridhari ............. | G06N 3/0472 |

(Continued)

OTHER PUBLICATIONS

Huang, G. et al. "Densely Connected Convolutional Networks," arXiv:1608.06993v5, Jan. 28, 2018. (9 pages).

(Continued)

*Primary Examiner* — Vijay B Chawan
(74) *Attorney, Agent, or Firm* — Mintz Levin Cohn Ferris Glovsky and Popeo, P.C.

(57) ABSTRACT

A method may include classifying a text by applying a dense convolutional neural network trained to classify the text. The dense convolutional neural network may include one or more dense convolution blocks, each of which including a plurality of convolution layers. Each dense convolution block may be configured to operate on a different quantity of consecutive tokens from the text. Moreover, each of the plurality of convolution layers in a dense convolution block may operate an input to the dense convolution block as well as an output from all preceding convolution layers in the dense convolution block. The text may correspond to an issue associated with a service ticket system. A response for addressing the issue associated with the test may be determined based on the classification of the text. Related systems and articles of manufacture are also provided.

18 Claims, 5 Drawing Sheets

(56) References Cited

U.S. PATENT DOCUMENTS

2019/0156206 A1* 5/2019 Graham ............... G06N 3/0454
2020/0372339 A1* 11/2020 Che ...................... G06N 3/0472

OTHER PUBLICATIONS

Zhang, Y. et al., "A Sensitivity Analysis of (and Practitioners' Guide to) Convolutional Neural Networks for Sentence Classification," arXiv:1510.038204v4, Apr. 6, 2016. (18 pages).

* cited by examiner

DENSELY CONNECTED CONVOLUTIONAL NEURAL NETWORK FOR SERVICE TICKET CLASSIFICATION

TECHNICAL FIELD

The subject matter described herein relates generally to machine learning and more specifically to a densely connected convolutional neural network for classifying text.

BACKGROUND

An automated service ticket system may be configured to track the creation, updating, and resolution of reported issues. The automated service ticket system may generate a ticket in response to an issue being reported, for example, via one or more telephone calls, emails, short messaging service (SMS) messages, social media posts, web chats, and/or the like. Moreover, the automated service ticket system may update the status of the ticket to reflect the progress towards resolving the issue. The automated service ticket system may generate the ticket to include a textual description of the issue associated with the ticket. A suitable response for addressing the issue associated with the ticket may be determined based at least on the textual description of the issue. As such, the automated service ticket system may rely on an accurate classification of the textual description of the issue in order to achieve an adequate resolution of the issue associated with the ticket.

SUMMARY

Systems, methods, and articles of manufacture, including computer program products, are provided for text classification. In one aspect, there is provided a system. The system may include at least one data processor and at least one memory. The at least one memory may store instructions that result in operations when executed by the at least one data processor. The operations may include: classifying a text by at least applying a dense convolutional neural network trained to classify the text, the dense convolutional neural network including a first dense convolution block configured to operate on a first quantity of consecutive tokens from the text, the first dense convolution block including a plurality of convolution layers, each of the plurality of convolution layers operating on an input to the dense convolutional neural network and an output from more than one preceding convolution layer in the first dense convolution block operating on the input, and the text corresponding to an issue associated with a service ticket system; and determining, based at least on the classification of the text, a response addressing the issue associated with the text.

In some variations, one or more features disclosed herein including the following features may optionally be included in any feasible combination. Each of the plurality of convolution layers may operate on the input to the dense convolutional neural network concatenated with outputs from all preceding convolution layers in the first dense convolution block.

In some variations, the dense convolutional neural network may further include a second dense convolution block including a second plurality of convolution layers. The second dense convolution block may be configured to operate on a second quantity of consecutive tokens from the text. The dense convolutional neural network may include a pooling layer configured to combine a first feature map output by the first dense convolution block and a second feature map output by the second dense convolution block to generate a condensed representation of the first feature map and the second feature map. The input to the dense convolutional neural network may be removed from each of the first feature map and the second feature map prior to pooling the first feature map and the second feature map with the input to the dense convolutional neural network. The pooling layer may apply an activation function configured to generate the condensed representation of the first feature map and the second feature map. The activation function may be an average function, a maximum function, and/or an attention mechanism.

In some variations, the dense convolutional neural network may classify the text by at least assigning, based at least on the condensed representation, one or more labels to the text. The one or more labels may include a first label that identifies the issue at a first level of specificity. The one or more labels may further include a second label that identifies the issue at a second level of specificity.

In some variations, the text may be preprocessed prior to applying the dense convolutional neural network. The preprocessing may include tokenizing the text to form a plurality of tokens. The text may be tokenized by at least applying a byte-pair-encoding such that each of the plurality of tokens correspond to a partial word or a full word from the text. The preprocessing may further include embedding each of the plurality of tokens by at least transforming each of the plurality of tokens to form a corresponding vector representation. The input to the dense convolutional neural network may include a matrix including a plurality of vector representations corresponding to the plurality of tokens.

In some variations, the dense convolutional neural network may be trained based at least on training data that includes one or more training samples of text associated with at least one ground-truth label. The training of the dense convolutional neural network may further include adjusting one or more weights applied by the dense convolutional neural network to at least minimize an error in an output of the dense convolutional neural network. The error in the output of the dense convolutional neural network may correspond to a difference between a label assigned by the dense convolutional neural network to the one or more training samples and the at least one ground-truth label associated with the one or more training samples.

In another aspect, there is provided a method for text classification. The method may include: classifying a text by at least applying a dense convolutional neural network trained to classify the text, the dense convolutional neural network including a first dense convolution block configured to operate on a first quantity of consecutive tokens from the text, the first dense convolution block including a plurality of convolution layers, each of the plurality of convolution layers operating on an input to the dense convolutional neural network and an output from more than one preceding convolution layer in the first dense convolution block operating on the input, and the text corresponding to an issue associated with a service ticket system; and determining, based at least on the classification of the text, a response addressing the issue associated with the text.

In some variations, one or more features disclosed herein including the following features may optionally be included in any feasible combination. Each of the plurality of convolution layers may operate on the input to the dense convolutional neural network concatenated with outputs from all preceding convolution layers in the first dense convolution block.

In some variations, the dense convolutional neural network may further include a second dense convolution block including a second plurality of convolution layers. The second dense convolution block may be configured to operate on a second quantity of consecutive tokens from the text.

In some variations, the method may further include: preprocessing the text prior to applying the dense convolutional neural network, the preprocessing includes tokenizing the text to form a plurality of tokens, the text being tokenized by at least applying a byte-pair-encoding such that each of the plurality of tokens correspond to a partial word or a full word from the text; and embedding each of the plurality of tokens by at least transforming each of the plurality of tokens to form a corresponding vector representation.

In another aspect, there is provided a computer program product that includes a non-transitory computer readable storage medium. The non-transitory computer-readable storage medium may include program code that causes operations when executed by at least one data processor. The operations may include: classifying a text by at least applying a dense convolutional neural network trained to classify the text, the dense convolutional neural network including a first dense convolution block configured to operate on a first quantity of consecutive tokens from the text, the first dense convolution block including a plurality of convolution layers, each of the plurality of convolution layers operating on an input to the dense convolutional neural network and an output from more than one preceding convolution layer in the first dense convolution block operating on the input, and the text corresponding to an issue associated with a service ticket system; and determining, based at least on the classification of the text, a response addressing the issue associated with the text.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a densely connected convolutional neural network for text classification, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
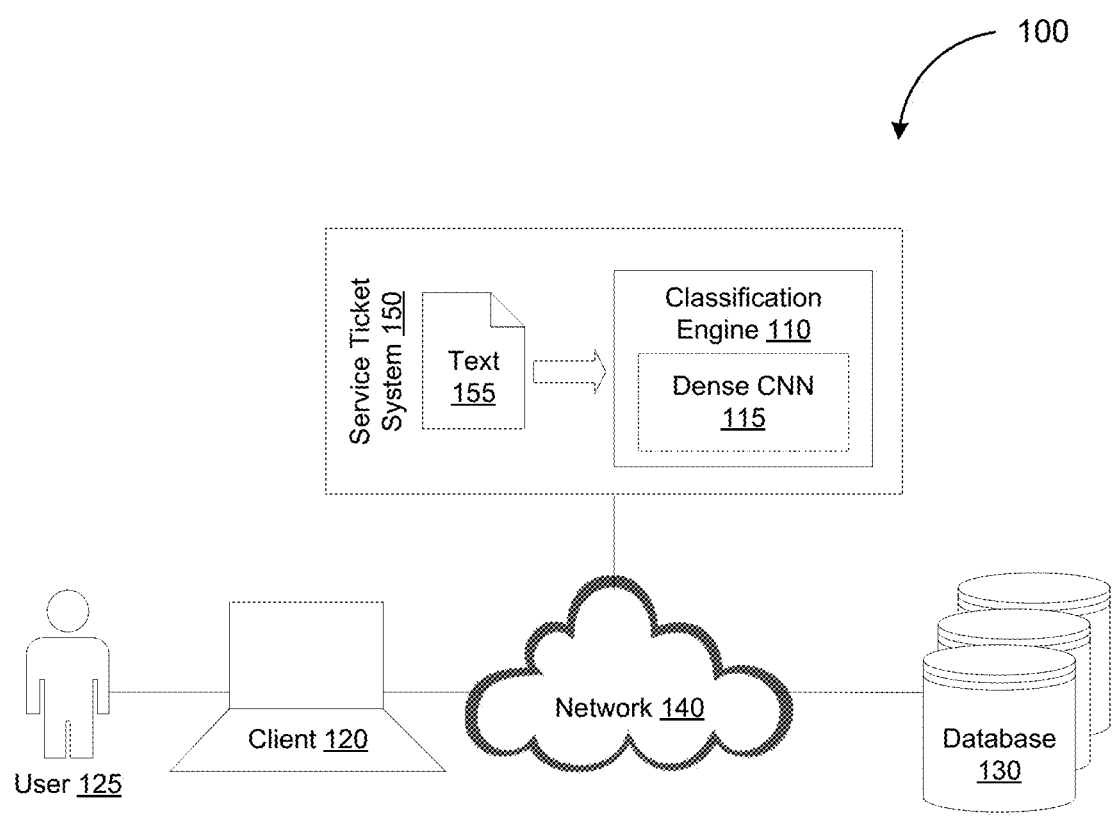
FIG. 1 depicts a system diagram illustrating a text classification system, in accordance with some example embodiments.

A convolutional neural network (CNN) may be configured to classify text including by assigning, to the text, one or more labels indicating, for example, one or more sentiments, topics, and/or intent associated with the text. Nevertheless, a conventional convolutional neural network may be inadequate as well as computationally inefficient for classifying text from a service ticket system, which may be multilingual, unstructured, and including diverse vocabularies of domain specific terms, abbreviations, and/or special characters. As such, in some example embodiments, instead of a conventional convolutional neural network, a classification engine may include a dense convolutional neural network trained to classify text including, for example, multilingual and unstructured text containing domain specific terms, abbreviations, and/or special characters. The classification engine may be deployed as part of a service ticket system in order to enable the resolution of tickets generated by the service ticket system. For example, the classification engine may classify the textual description of issues associated with a ticket such that the service ticket system is able to identify a suitable response for addressing the issue associated with the ticket.

In some example embodiments, the dense convolutional neural network for text classification may include one or more dense convolution blocks. A single dense convolution block may include multiple convolution layers. Each convolution layer in the dense convolution block may obtain inputs from more than one preceding convolution layer in the dense convolution block. For example, the input for a single convolution layer in the dense convolution block may include the input of the dense convolution block concatenated with the outputs from all preceding convolution layers in the dense convolution block. Furthermore, each dense convolution block in the dense convolutional neural network may be associated with a convolutional kernel configured to extract a corresponding feature from the input of the dense convolution block.

The input of a dense convolution block may include a matrix of embedded tokens corresponding to, for example, a textual description of an issue associated with a ticket generated by the service ticket system. The matrix may include one or more vectors, each of which representative of a token including one or more characters that form a partial word or a full word from the textual description of the issue associated with the ticket. According to some example embodiments, the dense convolution block operating on the matrix may apply a convolutional kernel configured to extract a feature, which may correspond to a syntactic attribute and/or a semantic attribute present in the textual description of the issue associated with the ticket. The features extracted by each dense convolution block in the dense convolutional neural network may be pooled to form a condensed representation of the textual description of the issue associated with the ticket. Furthermore, the dense convolutional neural network may classify, based at least on the condensed representation, the textual description of the issue associated with the ticket including by assigning one or more labels. For instance, the dense convolutional neural network may assign multiple hierarchical labels that identify, at varying levels of specificity, the issue associated with the ticket.

In some example embodiments, the dense convolutional neural network for text classification may include multiple dense convolution blocks. Each dense convolution block may apply a different size convolutional kernel that operates on a correspondingly sized n-grams, which are sequences containing an n-quantity of consecutive tokens from the textual description of the issue associated with the ticket. For example, the dense convolutional neural network may include a first dense convolution block configured to extract a first feature from a first quantity of consecutive tokens present the textual description of the issue associated with the ticket. The dense convolutional neural network may also include a second dense convolution block configured to extract a second feature from a second quantity of consecutive tokens present in the textual description of the issue associated with the ticket. The first dense convolution block and the second dense convolution block may operate, in parallel, on a same input of the matrix of embedded tokens. Moreover, the output from each of the first dense convolution block and the second dense convolution block may include the concatenated outputs from each of the constituent convolutional layers an as well as the original input. As such, redundant instances of the original input may be removed from the output from each of the first dense convolution block and the second dense convolution block before the output from each of the first dense convolution block and the second dense convolution block is pooled together with a single instance of the original input.

FIG. 1 depicts a system diagram illustrating a text classification system 100, in accordance with some example embodiments. Referring to FIG. 1, the text classification system 100 may include a classification engine 110, a client 120, and a database 130. As shown in FIG. 1, the classification engine 110, the client 120, and the database 130 may be communicatively coupled via a network 140. It should be appreciated that the client 120 may be any processor-based device including, for example, a smartphone, a tablet computer, a wearable apparatus, a virtual assistant, an Internet-of-Things (IoT) appliance, and/or the like. The network 140 may be any wired and/or wireless network including, for example, a wide area network (WAN), a local area network (LAN), a virtual local area network (VLAN), a public land mobile network (PLMN), the Internet, and/or the like.

In some example embodiments, the classification engine 110 may be deployed as part of a service ticket system 150 configured to track the creation, updating, and resolution of reported issues. For example, the service ticket system 150 may generate a ticket in response to receiving, from the client 120, a report of an issue associated with the user 125. The service ticket system 150 may receive the report of the issue through a variety of channels including, for example, one or more emails, short messaging service (SMS) messages, social media posts, web chats, telephone calls, and/or the like. In response to receiving the report of the issue from the client 120, the service ticket system 150 may generate one or more ticket. For instance, as shown in FIG. 1, the service ticket system 150 may generate at least one ticket including a text 155 associated with the issue. The text 155 may correspond to at least a portion of the text from the emails, short messaging service (SMS) messages, social media posts, web chats, and/or transcripts of the telephone calls received from the client 120. The text 155 may therefore include multilingual and unstructured text that includes domain specific terms, abbreviations, and/or special characters. Moreover, the text 155 may include multiple types of text including, for example, subject text, description text, and/or the like.

Accordingly, in order to identify a suitable response for addressing the issue associated with the ticket, the service ticket system 150, for example, the classification engine 110, may classify the text 155 by at least applying a dense convolutional neural network 115. In some example embodiments, the dense convolutional neural network 115 may be trained to assign multiple hierarchical labels to the text 155, each of which identifying the issue associated with the text 155 at a different level of specificity. For example, the classification engine 110 may assign, to the text 155, a first label identifying the issue as "pre-purchase" or "post-purchase." The classification engine 110 may also assign a second label identifying the type of issue, for example, as order information, product information, and/or the like. Alternatively and/or additionally, the classification engine 110 may assign a third label identifying the product and/or the product category associated with the issue.

The dense convolutional neural network 115 may be trained based on training data. Each training sample in the training data may include text associated with at least one ground-truth label corresponding to a correct label for the text. Training the dense convolutional neural network 115 may include minimizing an error in the output 260, which may correspond to a difference between the labels the dense convolutional neural network 115 assigns to a training sample and the ground-truth labels associated with the training sample. As such, in some example embodiments, the training of the dense convolutional neural network 115 may include determining a gradient of an error function (e.g., mean squared error (MSE), cross entropy, and/or the like) associated with the dense convolutional neural network 115.

The gradient of the error function associated with the dense convolutional neural network 115 may be determined, for example, by backward propagating the error in the output 260 of the dense convolutional neural network 115. It should be appreciated that the gradient of the error function may be preserved through the convolution layers of the dense convolutional neural network 115 because the original input into the dense convolutional neural network 115 is passed to multiple convolution layers in each dense convolution block in the dense convolutional neural network 115. By contrast, in a conventional convolutional neural network where each layer of the convolutional neural network obtains its output from only a single preceding layer, the gradient have a tendency to vanish as an input is processed through many layers of the convolutional neural network. Preserving the gradient of the error function may enable the error in the output 260 of the dense convolutional neural network 115 to be minimized by at least adjusting one or more weights applied by the dense convolutional neural network 115 until the gradient of the error function converges, for example, to a local minimum and/or another threshold value.

In some example embodiments, the classification engine 110 may be configured to preprocess the text 155 prior to applying the dense convolutional neural network 115. The classification engine 110 may preprocess the text 155 by at least tokenizing the text 155 to form a plurality of tokens, each of which corresponding to one or more characters that form a partial word or a full word from the text 155. Furthermore, the classification engine 110 may preprocess the text 155 by at least embedding the tokens to form a matrix representation of the text 155. The matrix representation of the text 155 may include multiple vectors, each of which corresponding to one of the tokens from the text 155. Embedding a token may include transforming the token to form a corresponding vector representation of the token in which the value of the token is expressed as one or more numerical values. It should be appreciated that when processing text from a multiple tickets, the classification engine 110 may generate a tensor that includes multiple matrices of vectors, each of which corresponding to one of the plurality of tickets.

As noted, the text 155 may include multilingual and unstructured text that includes domain specific terms, abbreviations, and/or special characters. To account for rare and unknown words that may potentially be part of the text 155, the classification engine 110 may apply byte-pair-encoding, which segments the text 155 into partial words as well as full words. By contrast, a conventional tokenization technique merely segments the text 155 into full words separated by white spaces and/or punctuations. In order to apply byte-pair-encoding, the classification engine 110 may generate, based on training data, a byte-pair-encoding vocabulary including partial words and/or full words that appear in the training data at an above-threshold frequency. The classification engine 110 may further segment, based at least on the byte-pair-encoding vocabulary, the text 155 into a sequence of tokens. Each token in the sequence of tokens may include one or more characters that correspond to a partial word or a full word from the text 155 that also appears in the byte-pair-encoding vocabulary. Moreover, each token in the sequence of tokens may be embedded by at least transforming each token into a corresponding vector representation. In order to classify the text 155, the classification engine 110 may apply the dense convolutional neural network 115 to the matrix representation of the text 155.

Figure 2:
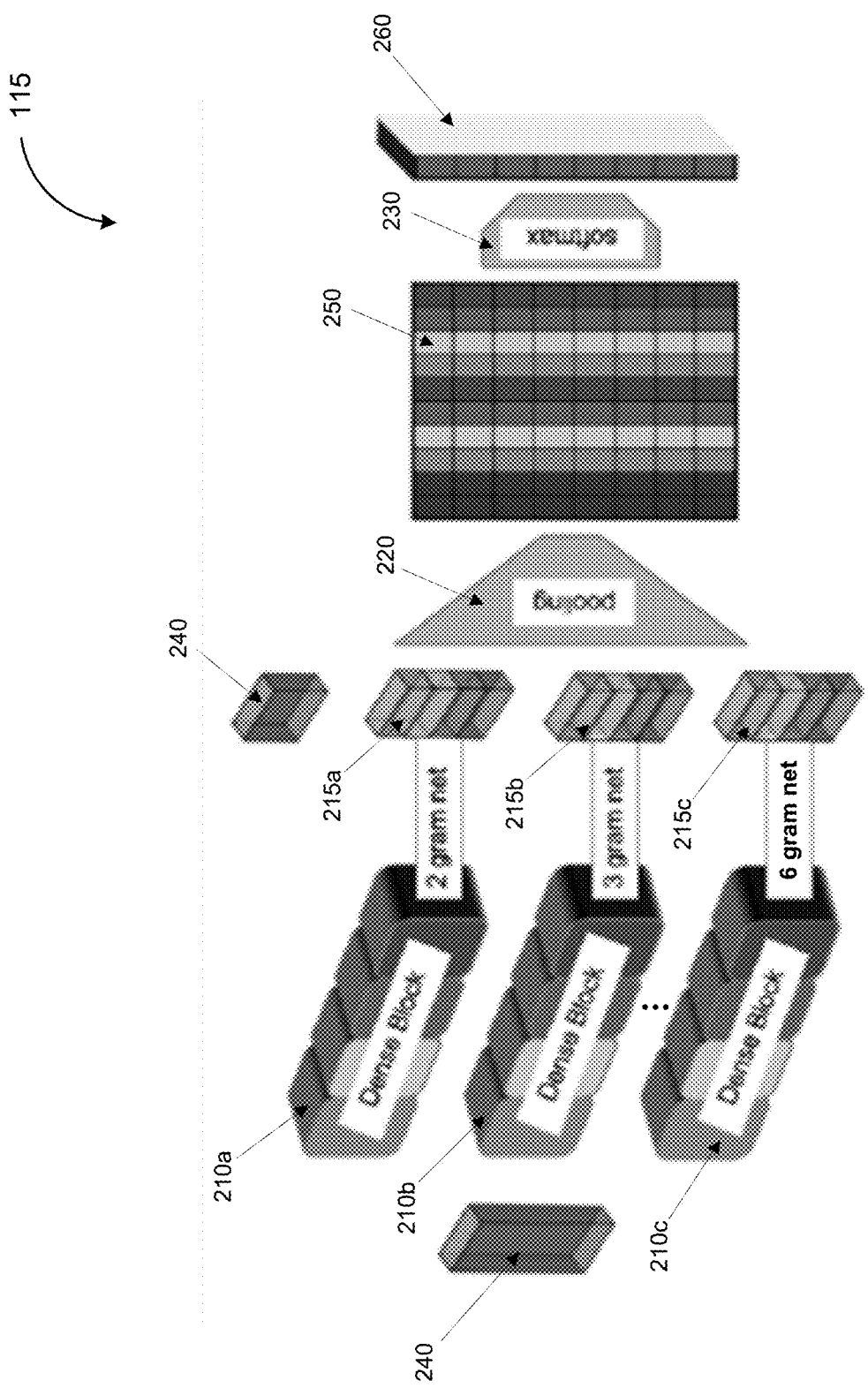
FIG. 2 depicts an example of a dense convolutional neural network, in accordance with some example embodiments.

FIG. 2 depicts an example of the dense convolutional neural network 115, in accordance with some example embodiments. Referring to FIG. 2, the dense convolutional neural network 115 may include a plurality of dense convolution blocks including, for example, a first dense convolution block 210a, a second dense convolution block 210b, a third dense convolution block 210c, and/or the like. As shown in FIG. 2, each dense convolution block may be associated with a kernel configured to extract a feature from a correspondingly sized n-grams. The feature extracted from each of the n-gram may correspond to a syntactic attribute and/or a semantic attribute that is present in the text 155. As used herein, an "n-gram" may refer to a sequence of an n-quantity of consecutive tokens from an input 240 into the dense convolutional neural network 115. The input 240 may be the matrix representation of the text 155 which, as noted, may include vectors that each corresponds to a token of one or more characters forming a partial word or a full word in the text 155.

As shown in FIG. 2, each of the first dense convolution block 210a, the second dense convolution block 210b, and the third dense convolution block 210c may operate in parallel on different sized n-grams to generate corresponding feature maps. For instance, the first dense convolution block 210a may operate on bigrams including two consecutive tokens from the input 240 to generate a first feature map 215a, the second dense convolution block 210b may operate on trigrams including three consecutive tokens from the input 240 to generate a second feature map 215b, and the third dense convolution block 210c may operate on hexagrams including six consecutive tokens from the input 240 to generate a third feature map 215c. The first feature map 215a, the second feature map 215b, and the third feature map 215c may each correspond to an intermediate representation of the input 240 which, as noted, may be a matrix representation of the text 155.

It should be appreciated that the dense convolutional neural network 115 may include a different quantity of dense convolution blocks than shown in FIG. 2. For example, in some example embodiments, the dense convolutional neural network 115 may include five dense convolution blocks. Furthermore, each convolution block in the dense convolutional neural network 115 may be configured to operate on a different sized n-gram than shown in FIG. 2. For instance, according to some example embodiments, the dense convolutional neural network 115 may include a first dense convolution block configured to operate on bigrams, a second dense convolution block configured to operate on trigrams, a third dense convolution block configured to operate on quadrigrams, a fourth dense convolution block configured to operate on pentagrams, and a fifth dense convolution block configured to operate on hexagrams.

In some example embodiments, the dense convolutional neural network 115 may include a pooling layer 220 and a classifier layer 230. As shown in FIG. 2, the pooling layer 220 may be configured to combine the first feature map 215a, the second feature map 215b, the third feature map 215c, and the original input 240 to generate a condensed representation 250 of the input 240.

The pooling layer 220 may transform each of the first feature map 215a, the second feature map 215b, and the third feature map 215c into a single vector by at least applying a pooling function such as, for example, a maximum function, an average function, or an attention mechanism which learns the weights of a weighted average function. The condensed representation 250 may further be combined using a second attention mechanism which learns the weights for a weighted average of each of the condensed representations created by the pooling layer 220. It should be appreciated that the input 240 may be removed from each of the first feature map 215a, the second feature map 215b, and the third feature map 215c prior to being combined with the input 240 by the pooling layer 220.

The input 240, which may be the matrix representation of the text 155, may include multiple types of text including, for example, subject text, description text, and/or the like. Accordingly, the dense convolutional neural network 115 may operate on the different types of text included in the input 240 collectively. For example, the pooling layer 220 may generate the condensed representation 250 to include the different types of text included in the input 240.

Alternatively, the input 240 may include separate matrices for the different types of text included in the text 155. For example, the input 240 may include a first matrix including subject text from the text 155 and a second matrix including description text from the text 155. As such, the dense convolutional neural network 115 may operate on each type of text included in the input 240 separately. For instance, the pooling layer 220 may generate a separate condensed representation 250 for each type of text included in the input 240 before combining the separate condensed representations 250 for classification by the classifier layer 230. It should be the appreciated that the pooling layer 220 may combine the condensed representation 250 of each type of text included in the input 240 in any manner but the output 260 of the dense convolutional neural network 115 may be optimized by applying the trainable weighted average function.

Referring again to FIG. 2, the classifier layer 230 may classify the text 155 corresponding to the input 240 by at least determining, based at least on the condensed representation 250, one or more labels forming the output 260 of the dense convolutional neural network 115. The classifier layer 230 may classify the text 155 corresponding to the input 240 by at least applying, to the condensed representation 250, an activation function including, for example, a softmax function and/or the like. In the example shown in FIG. 2, the classifier layer 230 may apply, to the condensed representation 250, a softmax function configured to output a vector representative of the probability distribution of the potential labels associated with the text 155. For example, the softmax function may normalized the condensed representation 250, which may include a K quantity of vectors, into a probability distribution of a K quantity of probabilities. That is, applying the softmax function may normalize, to a value within the interval (0, 1), each vector in the condensed representation 250 such that the sum of the normalized values is 1. To further illustrate, Equation (1) below depicts an example of a softmax function $\sigma: \mathbb{R}^K \to \mathbb{R}^K$.

$$\sigma(z)_i = \frac{e^{z_i}}{\sum_{j=1}^{K} e^{z_j}} \text{ for } i = 1, \ldots, K \text{ and } z = (z_1, \ldots, z_K) \in \mathbb{R}^K \quad (1)$$

wherein $\mathbb{R}^K$ may denote a K quantity of real numbers $\mathbb{R}$ and e may denote the exponential function, which may be applied to each element $z_i$ in the input vector z. The value of the exponential function being applied to each element $z_i$ in the input vector z may be further normalized (e.g., to a value within the interval (0, 1)) by at least being divided by the sum of the exponentials of every element $z_i$ in the input vector z.

In some example embodiments, the output 260 of the dense convolutional neural network 115 may include one or more hierarchical labels and the corresponding probabilities of the each label being associated with the text 155. Each hierarchical label may identify, at a certain level of specificity, the issue associated with the text 155. For example, the output 260 may include a first label identifying the issue associated with the text 155 as "pre-purchase" or "post-purchase." The output 260 may also a second label identifying the type of issue, for example, as order information, product information, and/or the like. Alternatively and/or additionally, the output 260 may include a third label identifying the product and/or the product category associated with the issue. It should be appreciated that the classification engine 110 may disregard the hierarchy of the labels and assign each hierarchical label separately. Accordingly, the classification engine 110 may assign, to the text 155, a combination of labels that identifies the issue associated with the text 155 at varying levels of specificity. This flattening of the hierarchical structure present in the labels may increase the computational efficiency of the classifier layer 230.

Figure 3:
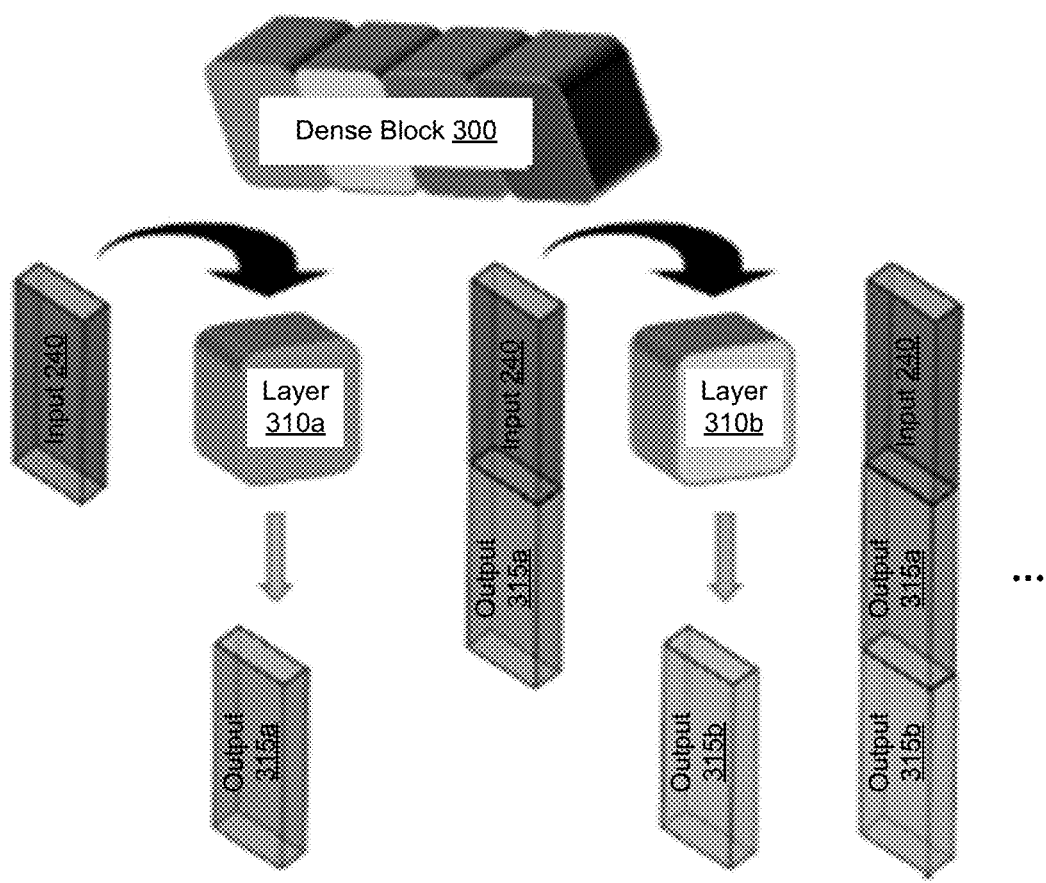
FIG. 3 depicts an example of a dense convolution block, in accordance with some example embodiments.

FIG. 3 depicts an example of a dense convolution block 300, in accordance with some example embodiments. Referring to FIG. 2 and FIG. 3, the dense convolution block 300 may implement the dense convolution blocks included in the dense convolutional neural network 115 such as, for example, the first dense convolution block 210a, the second dense convolution block 210b, and the third dense convolution block 210c. As shown in FIG. 3, the dense convolution block 300 may include multiple convolution layers including, for example, a first convolution layer 310a, a second convolution layer 310b, and/or the like.

In some example embodiments, each convolution layer in the dense convolution block 300 may obtain inputs from more than one preceding convolution layer in the dense convolution block 300. That is, the output from one convolution layer in the dense convolution block 300 may be concatenated with the input into that convolution layer before being passed onto a subsequent convolution layer in the dense convolution block 300. As shown in FIG. 3, the first convolution layer 310a may operate on the input 240 of the dense convolutional neural network 115 to generate a first output 315a. The first output 315a may be concatenated with the input 240 before being passed to the second convolution layer 310b. The second convolution layer 310b may operate on the concatenation of the first output 315a and the input 240 to generate a second output 315b. The second output 315b may be concatenated with the input into the second convolution layer 310b, which may include the input 240 and the first output 315a, before being passed onto a subsequent convolution layer in the dense convolution block 300.

The output of the dense convolution block 300 may be a feature map that includes the input 240 concatenated with the outputs from every convolution layer in the dense convolution block 300. This instance of the input 240 may be removed from the output of the dense convolution block 300 before the output from the dense convolution block 300 is pooled with outputs from other dense convolution blocks in the dense convolutional neural network 115 and a single instance of the input 240. For example, FIG. 2 shows the pooling layer 220 of the dense convolutional neural network 115 pooling the outputs from the dense convolution blocks in the dense convolutional neural network 115 to form the condensed representation 250. Moreover, the classifier layer 230 of the dense convolutional neural network 115 may apply, to the condensed representation 250, an activation function in order to determine one or more labels for the text 155 corresponding to the input 240.

Figure 4:
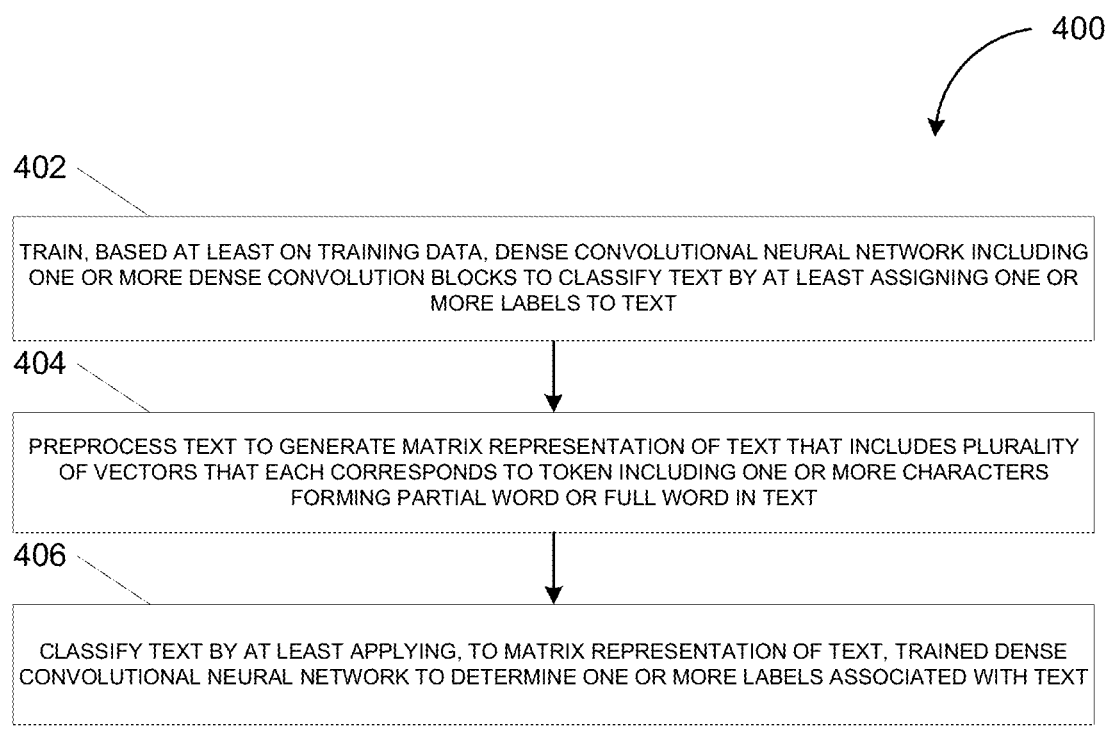
FIG. 4 depicts a flowchart illustrating an example of a process for text classification, in accordance with some example embodiments.

FIG. 4 depicts a flowchart illustrating a process 400 for text classification, in accordance with some example embodiments. Referring to FIGS. 1-4, the process 400 may be performed by the classification engine 110 in order to classify, for example, the text 155. As noted, the classification engine 110 may be deployed as part of the service ticket system 150. The text 155 may be part of a ticket that the service ticket system 150 generated in response to an issue reported by the user 125 via the client 120. The text 155 may include multilingual and unstructured text that includes domain specific terms, abbreviations, and/or special characters. Moreover, the text 155 may include multiple types of text including, for example, subject text, description text, and/or the like.

At 402, the classification engine 110 may train, based at least on training data, a dense convolutional neural network including one or more dense convolution blocks to classify text by at least assigning one or more labels to the text. In some example embodiments, the dense convolutional neural network 115 may be trained based on training data, which may one or more training samples of text associated with ground-truth labels. For example, training the dense convolutional neural network 115 may include determining a gradient of an error function (e.g., mean squared error (MSE), cross entropy, and/or the like) associated with the dense convolutional neural network 115 including by backward propagating the error in the output of the dense convolutional neural network 115. The error in the output 260 of the dense convolutional neural network 115 may correspond to a difference between the labels the dense convolutional neural network 115 assigns to a training sample and the ground-truth labels associated with the training sample. Furthermore, training the dense convolutional neural network 115 may include minimizing the error in the output 260 by at least updating one or more weights applied by the dense convolutional neural network 115 until the gradient of the error function converges, for example, to a local minimum and/or another threshold value.

At 404, the classification engine 110 may preprocess a text to generate a matrix representation of the text that includes a plurality of vectors that each corresponds to a token including one or more characters forming a partial word or a full word in the text. For example, the classification engine 110 may be configured to preprocess the text 155 prior to applying the dense convolutional neural network 115. As noted, the text 155 may include multilingual and unstructured text that includes domain specific terms, abbreviations, and/or special characters. Accordingly, the classification engine 110 may preprocess the text 155 by at least applying byte-pair-encoding to segment the text 155 into tokens that corresponds to partial words as well as full words. Moreover, the classification engine 110 may preprocess the text 155 by at least embedding the tokens to form a matrix representation of the text 155. The matrix representation of the text 155 may include multiple vectors, each of which corresponding to one of the tokens from the text 155. Embedding a token may therefore include transforming each token included in the text 155 to form a corresponding vector representation.

At 406, the classification engine 110 may classifying the text by at least applying, to the matrix representation of the text, the trained dense convolutional neural network to determine one or more labels associated with the text. For example, the classification engine 110 may classify the text 155 by at least applying the dense convolutional neural network 115, which may be trained to classify the text 155 by assigning, to the text 155, one or more labels. In some example embodiments, the one or more labels may be hierarchical. As such, each label assigned to the text 155 may identify, at a certain level of specificity, the issue associated with the text 155. For instance, the output 260 may include a first label identifying the issue associated with the text 155 as "pre-purchase" or "post-purchase." The output 260 may also a second label identifying the type of issue, for example, as order information, product information, and/or the like. Alternatively and/or additionally, the output 260 may include a third label identifying the product and/or the product category associated with the issue. In some example embodiments, the text 155 may be part of a ticket generated by the service ticket system 150 in response to service ticket system 150 receiving, from the client 120, a report of the issue. Accordingly, the classification engine 110 may classify the text 155, including by identifying the issue associated with the text 155, in order to enable the service ticket system 150 to identify a suitable response for addressing the issue.

Figure 5:
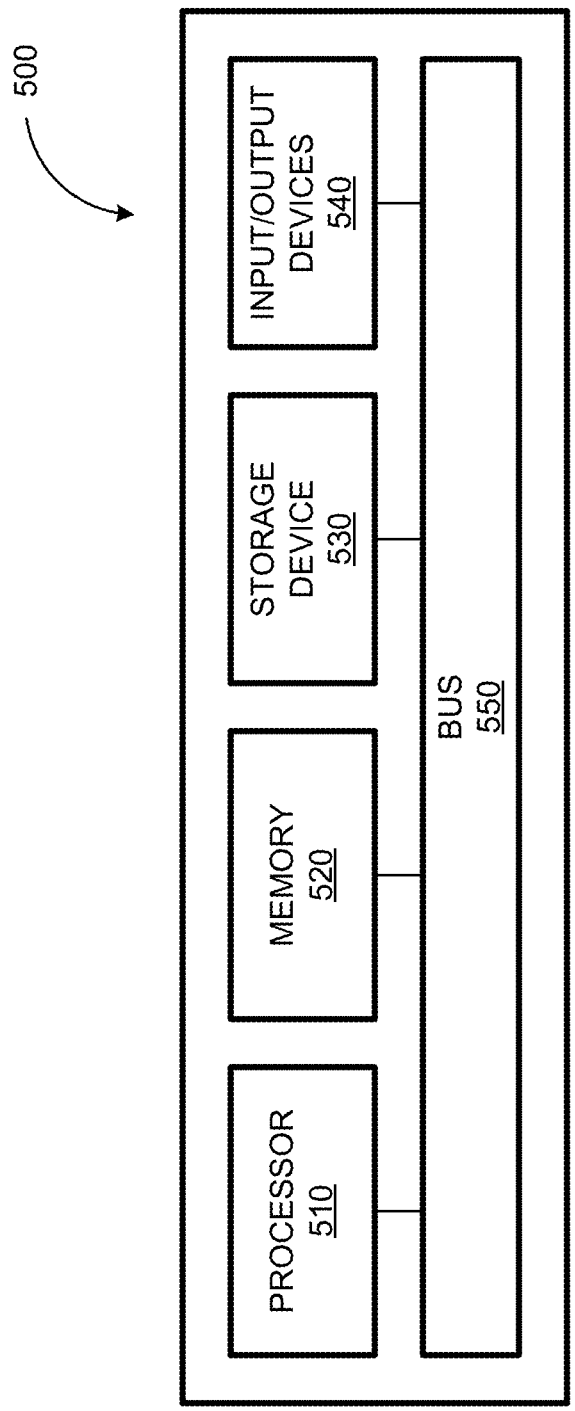
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1-5, the computing system 500 can be used to implement the classification engine 110 and/or any components therein.

As shown in FIG. 5, the computing system 500 can include a processor 510, a memory 520, a storage device 530, and input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the classification engine 110. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, a tape device, a solid-state device, and/or any other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
      classifying a text corresponding to an issue associated with a service ticket system by at least applying a dense convolutional neural network trained to classify the text, the dense convolutional neural network including a first dense convolution block configured to operate on a first quantity of consecutive tokens from the text to output a first feature map corresponding to the first quantity of consecutive tokens, the first dense convolution block including a plurality of convolution layers, each of the plurality of convolution layers operating on an input to the dense convolutional neural network and an output from more than one preceding convolution layer in the first dense convolution block operating on the input, the dense convolutional neural network further including a second dense convolution block including a second plurality of convolution layers, the second dense convolution block configured to operate on a second quantity of consecutive tokens from the text to output a second feature map corresponding to the second quantity of consecutive tokens, the first quantity of consecutive tokens and the second quantity of consecutive tokens being different sized sequences of consecutive tokens, and the dense convolutional neural network determining a classification for the text based at least on a condensed representation of the text that combines the first feature map and the second feature map; and determining, based at least on the classification of the text, a response addressing the issue associated with the text.

2. The system of claim 1, wherein each of the plurality of convolution layers operates on the input to the dense convolutional neural network concatenated with outputs from all preceding convolution layers in the first dense convolution block.

3. The system of claim 1, wherein the dense convolutional neural network includes a pooling layer configured to combine the first feature map output by the first dense convolution block and the second feature map output by the second dense convolution block to generate the condensed representation of the first feature map and the second feature map.

4. The system of claim 3, further comprising:

removing, from each of the first feature map and the second feature map, the input to the dense convolutional neural network prior to pooling the first feature map and the second feature map with the input to the dense convolutional neural network.

5. The system of claim 3, wherein the pooling layer applies an activation function configured to generate the condensed representation of the first feature map and the second feature map.

6. The system of claim 5, wherein the activation function comprises an average function, a maximum function, and/or an attention mechanism.

7. The system of claim 3, wherein the dense convolutional neural network classifies the text by at least assigning, based at least on the condensed representation, one or more labels to the text.

8. The system of claim 7, wherein the one or more labels include a first label that identifies the issue at a first level of specificity, and wherein the one or more labels further include a second label that identifies the issue at a second level of specificity.

9. The system of claim 1, further comprising:

preprocessing the text prior to applying the dense convolutional neural network, the preprocessing includes tokenizing the text to form a plurality of tokens.

10. The system of claim 9, wherein the text is tokenized by at least applying a byte-pair-encoding such that each of the plurality of tokens correspond to a partial word or a full word from the text.

11. The system of claim 9, wherein the preprocessing further includes embedding each of the plurality of tokens by at least transforming each of the plurality of tokens to form a corresponding vector representation.

12. The system of claim 11, wherein the input to the dense convolutional neural network comprises a matrix including a plurality of vector representations corresponding to the plurality of tokens.

13. The system of claim 1, further comprising:

training, based at least on training data, the dense convolutional neural network, the training data include one or more training samples of text associated with at least one ground-truth label.

14. The system of claim 13, wherein the training of the dense convolutional neural network further includes adjusting one or more weights applied by the dense convolutional neural network to at least minimize an error in an output of the dense convolutional neural network, and wherein the error in the output of the dense convolutional neural network correspond to a difference between a label assigned by the dense convolutional neural network to the one or more training samples and the at least one ground-truth label associated with the one or more training samples.

15. A computer-implemented method, comprising:

classifying a text corresponding to an issue associated with a service ticket system by at least applying a dense convolutional neural network trained to classify the text, the dense convolutional neural network including a first dense convolution block configured to operate on a first quantity of consecutive tokens from the text to output a first feature map corresponding to the first quantity of consecutive tokens, the first dense convolution block including a plurality of convolution layers, each of the plurality of convolution layers operating on an input to the dense convolutional neural network and an output from more than one preceding convolution layer in the first dense convolution block operating on the input, the dense convolutional neural network further including a second dense convolution block including a second plurality of convolution layers, the second dense convolution block configured to operate on a second quantity of consecutive tokens from the text to output a second feature map corresponding to the second quantity of consecutive tokens, the first quantity of consecutive tokens and the second quantity of consecutive tokens being different sized sequences of consecutive tokens, and the dense convolutional neural network determining a classification for the text based at least on a condensed representation of the text that combines the first feature map and the second feature map; and determining, based at least on the classification of the text, a response addressing the issue associated with the text.

16. The method of claim 15, wherein each of the plurality of convolution layers operates on the input to the dense convolutional neural network concatenated with outputs from all preceding convolution layers in the first dense convolution block.

17. The method of claim 15, further comprising:

preprocessing the text prior to applying the dense convolutional neural network, the preprocessing includes tokenizing the text to form a plurality of tokens, the text being tokenized by at least applying a byte-pair-encoding such that each of the plurality of tokens correspond to a partial word or a full word from the text; and embedding each of the plurality of tokens by at least transforming each of the plurality of tokens to form a corresponding vector representation.

18. A non-transitory computer-readable medium storing instructions, which when executed by the at least one data processor, result in operations comprising:

classifying a text corresponding to an issue associated with a service ticket system by at least applying a dense convolutional neural network trained to classify the text, the dense convolutional neural network including a first dense convolution block configured to operate on a first quantity of consecutive tokens from the text to output a first feature map corresponding to the first quantity of consecutive tokens, the first dense convolution block including a plurality of convolution layers, each of the plurality of convolution layers operating on an input to the dense convolutional neural network and an output from more than one preceding convolution layer in the first dense convolution block operating on the input, the dense convolutional neural network further including a second dense convolution block including a second plurality of convolution layers, the second dense convolution block configured to operate on a second quantity of consecutive tokens from the text to output a second feature map corresponding to the second quantity of consecutive tokens, the first quantity of consecutive tokens and the second quantity of consecutive tokens being different sized sequences of consecutive tokens, and the dense convolutional neural network determining a classification for the text based at least on a condensed representation of the text that combines the first feature map and the second feature map; and determining, based at least on the classification of the text, a response addressing the issue associated with the text.

* * * * *